United States Patent [19]
Clark

[11] 3,930,026
[45] Dec. 30, 1975

[54] CHEWING GUM HAVING ENHANCED FLAVOR

[75] Inventor: K. Warren Clark, Brewster, N.Y.

[73] Assignee: E. R. Squibb & Sons, Inc., Princeton, N.J.

[22] Filed: Aug. 28, 1974

[21] Appl. No.: 501,325

[52] U.S. Cl. .................................... 426/3; 426/650
[51] Int. Cl.[2] ...................... A23G 3/00; A23G 3/30
[58] Field of Search ........................... 426/3–6, 223, 426/221, 96, 190

[56] References Cited

UNITED STATES PATENTS

| | | | |
|---|---|---|---|
| 2,019,494 | 11/1935 | Jordan | 426/223 |
| 2,566,410 | 9/1951 | Griffin | 426/223 |
| 2,754,215 | 7/1956 | Evans | 426/223 |
| 3,666,496 | 5/1972 | Honey et al. | 426/223 |
| 3,795,744 | 3/1974 | Ogawa et al. | 426/223 |
| 3,826,847 | 7/1974 | Ogawa et al. | 426/3 |

*Primary Examiner*—Jeanette M. Hunter
*Attorney, Agent, or Firm*—Lawrence S. Levinson; Merle J. Smith; Burton Rodney

[57] ABSTRACT

Enhanced flavor in chewing gum is obtained by sorbing the flavor on a hydrophilic colloid in conjunction with a surfactant.

4 Claims, No Drawings

CHEWING GUM HAVING ENHANCED FLAVOR

OBJECTS OF THE INVENTION

It is an object of the present invention to provide chewing gum having enhanced or intensified flavor as compared to conventional chewing gum having identical levels of flavors. Another object is to provide a method for enhancing or intensifying the flavor of chewing gum without increasing the level of flavor. A further object is to provide a method for preparing chewing gum having enhanced flavor. These and other objects of the present invention will be apparent from the following description.

SUMMARY OF THE INVENTION

Chewing gum having enhanced or intensified flavor is obtained by sorbing the flavor and an edible surfactant on an edible hydrophilic colloid. The resulting gum has an intensified and enhanced flavor compared to conventional gum having the same level of flavor.

DETAILED DESCRIPTION

It has now been found that the flavor of chewing gum is enhanced or intensified by combining the flavor with an edible surfactant (surface active agent) and sorbing the flavor and surfactant on an edible hydrophilic colloid. The flavor of the resulting gum is noticeably enhanced or intensified in comparison with gum otherwise identical except that the flavor is not sorbed in the presence of a hydrophilic colloid. The types of surfactants that are useful according to the present invention are anionic, cationic and non ionic surfactants.

An anionic surfactant is one whose hydrophilic moiety is a polar group that is negatively charged in an aqueous solution or dispersion. Typically this polar group is a carboxylate, sulfonate, sulfate, or phosphate group. A suitable anionic surfactant is, for example, sodium di(2-ethylhexyl)sulfosuccinate.

A non ionic surfactant is one which bears essentially no charge when dissolved or dispersed in aqueous media. Suitable non ionic surfactants are, for example, polyoxyethylene (20) sorbitan monostearate, polyoxyethylene (20) sorbitan monooleate, fatty acid monoglycerides or fatty acid diglycerides.

A cationic surfactant is one whose hydrophilic moiety is an amino or quaternary nitrogen. These hydrophilic moieties bear a positive charge when dissolved in aqueous media. Suitable cationic surfactants are, for example, phosphatides, such as cephalin and lecithin.

A more complete discussion and description of anionic, non ionic and cationic surfactants is available in the published chemical literature, for example, Kirk-Othmer, Encyclopedia of Chemical Technology, Second Edition, Volume 19, page 507 et seq. It is to be understood, however, that any non-toxic physiologically acceptable surfactant cleared by the FDA for food use may be used according to the present invention. Typically, the surfactant is employed at a concentration of from about 0.01% by weight to about 0.5% by weight of the total composition, preferably from about 0.05% to about 0.2% by weight of the total composition.

The hydrophilic colloid used to sorb the flavor and surfactant may be any edible hydrophilic colloid, e.g., gum arabic, ethyl cellulose, calcium alginate, etc.

The following example illustrates the present invention without limiting the same thereto.

EXAMPLE 1

Chewing Gum

| Ingredient | Part by Weight |
|---|---|
| Gum base | 108.0 |
| Sucrose | 296.0 |
| Corn syrup (44 Dextrose Equivalent) | 90.0 |
| Gum Arabic | 7.5 |
| Peppermint Oil | 0.8 |
| Polyoxyethylene (20) sorbitan monostearate | 0.2 |

Gum arabic, 200 g, is added slowly to 450 ml of water in a stainless steel beaker placed under a dispersion unit. The speed of the dispersion unit is increased as the mixture becomes more viscous. The flavoring and surfactant are then added and the mixture spray dried to sorb the flavor and surfactant on the gum arabic.

The gum base is melted and the corn syrup added with mixing until uniform. The sugar is then added and mixed until uniform. The sorbed flavor-surfactant, 7.5 parts by weight, is then added with mixing until uniform. The gum is then processed conventionally, i.e., rolled and scored into chewing gum sticks.

When compared organoleptically against two gums having identical levels of flavor but differing in that one had the flavor sorbed on gum arabic but contained no surfactant, while the other contained neither gum arabic nor surfactant, the gum containing the sorbed flavor-surfactant is observed to have a much higher flavor impact which is judged to be several times as strong as that of the other two gums.

What is claimed is:

1. A chewing gum comprising a gum base having incorporated therein particles of flavor and particles of an edible non-ionic surfactant, the flavor particles and the edible surfactant particles being jointly sorbed in an edible hydrophilic colloid.

2. A chewing gum according to claim 1 comprising from about 0.01% by weight to about 0.5% by weight of said non-ionic surfactant and from about 0.1% to about 0.4% by weight of flavor.

3. A chewing gum according to claim 2 having from about 0.05% by weight to about 0.2% by weight of surfactant.

4. A method for preparing a chewing gum according to claim 1 comprising sorbing particles of flavor and particles of surfactant in an edible hydrophilic colloid and incorporating the sorbed particles in a chewing gum base.

* * * * *

UNITED STATES PATENT AND TRADEMARK OFFICE

CERTIFICATE OF CORRECTION

PATENT NO. : 3,930,026

DATED : December 30, 1975

INVENTOR(S) : K. Warren Clark

It is certified that error appears in the above-identified patent and that said Letters Patent are hereby corrected as shown below:

Abstract page, line [73] should read
--Assignee: Life Savers, Inc.
New York, N.Y. --

Signed and Sealed this

*Ninth* Day of *May 1978*

[SEAL]

Attest:

RUTH C. MASON
*Attesting Officer*

LUTRELLE F. PARKER
*Acting Commissioner of Patents and Trademarks*